3,270,028
CERTAIN 3-ARYL-1,2,4-OXADIAZOLES
Giuseppe Palazzo, Rome, Italy, assignor to Aziende Chimiche Riunite Angelini Francesco
No Drawing. Filed Jan. 2, 1964, Ser. No. 335,369
Claims priority, application Italy, May 8, 1963, 9,649/63
2 Claims. (Cl. 260—307)

This invention relates to a series of 3-aryl-1,2,4-oxadiazole derivatives having the general Formula I:

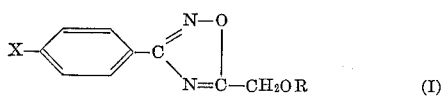

wherein R is a member selected from the group consisting of hydrogen an a —CO—R'—COOH grouping, R' being a member selected from the group consisting of saturated or unsaturated divalent aliphatic hydrocarbon residues having from 2 to 4 carbon atoms; X is a member selected from the group consisting of hydrogen, alkyl residues having from 1 to 4 carbon atoms, alkoxy residues having from 1 to 4 carbon atoms, hydroxy, amino-groups, halogen, and —NHCOOC$_2$H$_5$, and to a method for their preparation.

The compounds of the general Formula I may be prepared according to the invention by reacting an anhydrous alkali metal acetate, such as sodium or potassium acetate, with the corresponding 3-aryl-5-chloromethyl-1,2,4-oxadiazoles carrying an X group, or a group which may be converted into an X group, on the phenyl ring, in the presence of acetic acid, and by the subsequent hydrolysis of the so-formed acetoxymethyl derivative followed, when it is desired to prepare compounds of the Formula I where R represents the acyl residue of a dicarboxylic acid, by the reaction with the anhydride corresponding to the dicarboxylic acid in question. The method according to the invention may be represented by the following scheme:

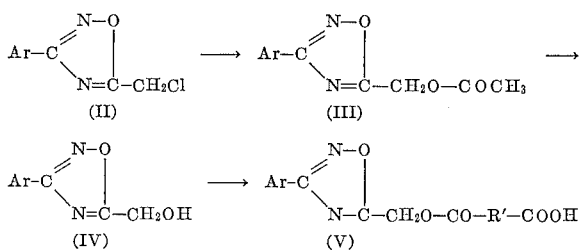

wherein R' is a saturated or unsaturated divalent aliphatic residue having from 2 to 4 carbon atoms, while Ar is either a

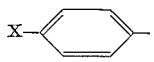

group, X having the above-mentioned meaning, or a

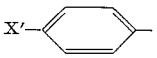

group, X' representing a group which may be converted into an X group, such as a nitro group which may be reduced to an amino-group, or a CH$_3$—COO— group, originated from the reaction of the phenolic hydroxyl group with the anhydrous alkali metal acetate.

The acetyl derivatives (III) may be prepared by heating for several hours, practically to the boiling point, a chloromethyl derivative mixture with approximately a stoichiometric amount of anhydrous alkali metal acetate in the presence of glacial acetic acid. The solvent is then removed at the reaction temperature, and the residue is treated with water to dissolve the formed salts. The so-formed product may be recrystallized from a suitable solvent.

The hydrolysis of the acetyl derivatives (III) may be carried out by boiling them with caustic alkali, such as KOH, in an alcoholic medium. It has surprisingly been found that, when Ar in the Formula III represents a 4-halogenophenyl group, the acetoxymethyl derivative is quite readily hydrolized.

The 3-(4-nitro)-phenyl-5-hydroxymethyl-1,2,4-oxadiazole obtained from the hydrolysis of the corresponding acetoxymethyl derivative may readily be converted into 3-(4'-amino)-phenyl-5-hydroxymethyl - 1,2,4-oxadiazoles (according to the general Formula I when X=NH$_2$) by reduction, e.g., with SnCl$_2$; the amino-derivative itself may finally be converted into 3-(4-carbethoxyamino)-phenyl-5-hydroxymethyl-1,2,4-oxadiazoles (according to the general Formula I when X=NHCOOC$_2$H$_5$) by substantially known methods (treatment with ethyl chloroformate).

The compounds of the general Formula I, wherein R represents the residue of a dicarboxylic acid, may be prepared according to the invention by reacting the 3-aryl-5-hydroxymethyl-1,2,4-oxadiazoles with the corresponding dicarboxylic acid anhydrides, according to substantially known methods.

The reaction of the hydroxymethyl derivatives with the acid anhydrides may be carried out in the presence or in the absence of solvents; these are of course selected among the materials which are inert towards the reaction; aromatic hydrocarbons, particularly xylene and pyridine, which exert a catalytic effect on the esterification reaction, are preferred.

The invention products possess outstanding phamacological properties, and particularly analgesic anti-inflammatory and antipyretic activities, as observed, for instance, in 3-phenyl-5-hydroxymethyl - 1,2,4 - oxadiazole, and 3-(4'-hydroxy)phenyl-5-hydroxymethyl-1,2,4-oxadiazole.

These materials were tested for toxicity, and it was found that the laboratory animals tolerated doses greater than 1000 mg./fk. p.o. without dying, and showed only easily eliminated disturbances consisting of a sluggish and muscular hypotonicity condition. The analgesic activity was pointed out by tests using inflammatory pains, on the contrary it was absent in tests using non-inflammatory pains. Therefore, from a qualitative point-of-view, these materials seemed to be more comparable to acetyl salicylic acid than to central analgesics. They were 2 to 3 times more active than acetyl salicyclic acid and aminopyrine. The anti-inflammatory activity was tested against both oedema caused in the rat by injecting one of its hind legs with irritant substances, and granuloma caused by a foreign body. The former test showed that the invention products were active at 3 to 4 times lower doses in comparison with acetyl salicyclic acid; on the contrary their activity against granuloma appeared to be less strong. As far as the antipyretic activity is concerned, the invention compounds were tested in rats which were made hyperpyretic by injecting them with non-specific pyretogenous substances. This activity resulted as strong as the activity of acetyl salicyclic acid.

The compounds of the general Formula I, wherein R represents the acyl residue of a dicarboxylic acid, giving easily soluble alkali metal salts, particularly sodium salts, are similarly characterized by interesting analgesic and anti-inflammatory properties. The pharmacology of these materials shows that all of them have a low acute and chronic toxicity. LD$_{50}$ by the oral route in both the mouse and the rat is higher than 2 g./kg. for almost all of the compounds. Chronic administrations to the rat of 0.5 g. p.o. for three months do not cause any toxic effect. As far as activity is concerned, some data relating to 3-phenyl-5-hydroxymethyl-1,2,4-oxadiazole acid succinate are reported.

As it has already been mentioned, its main characteristics are the analgesic and anti-inflammatory properties. The analgesic activity is only apparent when tested by tests using an inflamed tissue caused pain response (La Belle and Tislow, 1950; Randall and Selitto, 1957). On the contrary, the product is completely inactive towards a pain response caused by tissues which are not inflamed (Woolfe and MacDonald, 1944; Bianchi and Franceschini, 1954). In this respect it may therefore be compared more to analgesic such as acetyl salicylic acid (not narcotic analgesics, or anti-inflammatory analgesics) than to central analgesics such as morphine or d-propoxyphene. The active doses are from 10 to 15 mg./kg. by the subcutaneous route or from 25 to 30 mg./kg. p.o. in the rat. The product is therefore approximately twice as active as acetyl salicylic acid. The analgesic activity takes place simultaneously with a marked inhibition of the local inflammatory condition. It may therefore be stated that the analgesic and anti-inflammatory activities are closely related to each other. In this respect, the product is approximately as active as phenylbutazone. Furthermore, an anti-pyretic activity similar to that of acetyl salicylic acid has been pointed out. The Smith and Hamburger test (1938) has been employed for these experiments.

Sedation and muscular relaxation are only observed at doses which are markedly higher than those having significant pharmacological properties (100 mg./kg. introperitoneally, or 200 mg./kg. p.o.).

The following examples illustrate the invention process and products and the preparation of some intermediates in greater detail, but are not to be regarded as limitations.

*Example I.—3-p-methoxyphenyl-5-acetoxymethyl-1,2,4-oxadiazole*

14.6 gr. of 3-p-methoxyphenyl-5-chloromethyl-1,2,4-oxadiazole, 10.7 gr. of fused sodium acetate and 33 ml. of glacial acetic acid were heated for 16 hours in a bath held at 140° C. The acetic acid was then removed by distillation under reduced pressure and the residue was taken up with water to give 15.3 gr. of a solid product melting at 63° C. and having an analysis corresponding to that calculated for 3-p-methoxyphenyl-5-acetoxymethyl-1,2,4-oxadiazole.

*Example II.—3-p-methoxyphenyl-5-hydroxymethyl-1,2,4-oxadiazole*

15.3 gr. of the acetyl derivative described in Example I above were refluxed for 2 hours in a solution of 3.7 gr. of potassium hydroxide in 50 ml. of ethanol. The solvent was removed by distillation and the residue taken up again with water, filtered and washed with water. The so-separated solid was 3-p-methoxyphenyl-5-hydroxymethyl-1,2,4-oxadiazole which, in the crude state, weighed 11.6 gr. and melted at 154–156° C. The hydroxymethyl derivative, after recrystallization from benzene, melted at 158–159° C. The analysis corresponded with the calculated analysis.

*Example III.—3-p-chlorophenyl-5-hydroxymethyl-1,2,4-oxadiazole*

0.1 mole of 3-p-chlorophenyl-5-chloromethyl-1,2,4-oxadiazole, 0.2 mole of fused sodium acetate and 45 ml. of glacial acetic acid were heated for 16 hours in a bath at 150° C. After removing acetic acid by distillation, the residue was again taken up with water, and filtered at the pump. 3-p-chlorophenyl-5-hydroxymethyl-1,2,4-oxadiazole was obtained in a yield of 90% and, after recrystallization from benzene, melted at 95–96° C.

*Example IV.—O-chloroacetyl-p-hydroxybenzamidoxime*

To a stirred suspension of 38 g. of p-hydroxybenzamidoxime and 19.5 gr. of anhydrous potassium carbonate in 300 ml. of acetone, was slowly added a solution of 32 gr. of chloroacetyl chloride in 70 ml. of acetone, while externally cooling on an ice bath. The reaction mixture was allowed to stand for 2 hours at room temperature, after which the resulting precipitate was recovered by filtration and washed with little water. After drying, the reaction product weighed 55 gr. After recrystallization from aqueous methanol, it melted at 117° C.

*Example V.—3-p-hydroxyphenyl-5-chloromethyl-1,2,4-oxadiazole*

47 gr. of crude O-chloroacetyl-p-hydroxybenzamidoxime were heated at 125° C. under reduced pressure for ½ hour to give 38 gr. of 3-p-hydroxyphenyl-5-chloromethyl-1,2,4-oxadiazole, which, after recrystallization from aqueous methanol, melted at 114° C.

*Example VI.—3-p-acetoxyphenyl-5-acetoxymethyl-1,2,4-oxadiazole*

34 gr. of 3-p-hydroxyphenyl-5-chloromethyl-1,2,4-oxadiazole, 40 gr. of anhydrous sodium acetate and 120 ml. of glacial acetic acid were heated for 16 hours at 140° C. The warm reaction mixture was poured into water and the product was extracted with ether. The ether layer was then dried and the solvent removed to give 22 gr. of 3 - p - acetoxyphenyl - 5 - acetoxymethyl - 1,2,4 - oxadiazole, which, after recrystallization from benzene, melted at 99° C.

*Example VII.—3-p-nitrophenyl-5-acetoxymethyl-1,2,4-oxadiazole*

10 gr. of 3-p-nitrophenyl-5-chloromethyl-1,2,4-oxadiazole, 7 gr. of anhydrous sodium acetate and 30 ml. of glacial acetic acid were heated for 16 hours at 140° C. Afterwards the reaction mixture was poured into water and the resulting precipitate was recovered by filtration and thoroughly washed with water to give a product which, after recrystallization from acetone, melted at 111° C.

*Example VIII.—3-p-aminophenyl-5-hydroxymethyl-1,2,4-oxadiazole*

8 gr. of 3-p-nitrophenyl-5-acetoxymethyl-1,2,4-oxadiazole were reacted at 65° C. for about ½ hour with a solution of 24 gr. of $SnCl_2 \cdot 2H_2O$ in 24 ml. of concentrated HCl in the presence of 50 ml. of ethanol. The reaction mixture was then diluted with 50 ml. of water and filtered, and the filtrate was made alkaline by adding potassium carbonate and extracted with ether. The resulting ether layer was dried and the solvent removed to give 5 gr. of 3-p-aminophenyl-5-hydroxymethyl-1,2,4-oxadiazole, which, after recrystallization from benzene, melted at 107° C. The corresponding hydrochloride melted at 207° C.

The following compounds may be obtained in a similar way, as described in the above examples:

3-phenyl-5-acetoxymethyl-1,2,4-oxadiazole—$B.P._{0.5}$ 130° C.

3-phenyl-5-hydroxymethyl-1,2,4-oxadiazole—M.P. 590° C.

3-(4' - isopropyl)phenyl - 5 - acetoxymethyl - 1,2,4-oxadiazole $B.P._{0.2}$ 150° C.

3-(4' - isopropoxy)phenyl - 5 - hydroxymethyl-1,2,4-oxadiazole—M.P. 69–71° C.

3 - (4' - hydroxy)phenyl - 5 - hydroxymethyl-1,2,4-oxadiazole—M.P. 135° C.

3 - (4' - carbethoxyamino)phenyl-5-hydroxymethyl-1,2,4-oxadiazole—M.P. 132° C.

*Example IX.—3-phenyl-5-hydroxymethyl-1,2,4-oxadiazole acid succinate*

17.6 gr. of 3-phenyl-5-hydroxymethyl-1,2,4-oxadiazole and 11 gr. of succinic anhydride are heated to 140° C. for 2 and a half hours. At the end, the mixture is completely soluble in 5% sodium carbonate. It is acidified and extracted with ether. The ethereal layer is washed and dried, leaving a residue of 19 gr. of substantially pure 3-phenyl-5-hydroxymethyl-1,2,4-oxadiazole acid succinate. This compound, when crystallized from benzene, melts at 101° C.

*Example X.—3 - phenyl-5-hydroxymethyl-1,2,4-oxadizole acid maleate*

Equimolecular amounts of 3-phenyl-5-hydroxymethyl-1,2,4-oxadiazole and maleic anhydride are heated to 130° C. for six hours in a volume of xylene equal to 9 times the weight of the oxadiazole. The mixture is cooled and extracted with 5% sodium carbonate, the alkaline solution is acidified and extracted with ether. The ethereal layer is washed, dried, and then evaporated. A residue of almost pure 3-phenyl-5-hydroxymethyl-1,2,4-oxadiazole acid maleate is left. The compound, upon crystallization from benzene, melts at 103° C.

*Example XI.—3-phenyl-5-hydroxymethyl-1,2,4-oxadiazole acid glutarate*

Equimolecular amounts of 3-phenyl-5-hydroxymethyl-1,2,4-oxadiazole and glutaric anhydride are heated to 120° C. for six hours in a volume of anhydrous pyridine equal to twice the weight of the oxadiazole. At the end of the reaction the mixture is cooled and poured into diluted hydrochloric acid, and the formed solids are filtered. These are then treated with a 5% solution of sodium carbonate, extracted from little insoluble material, and acidified. The mixture is extracted with ether and then washed and dried. Substantially pure 3-phenyl-5- hydroxymethyl-1,2,4-oxadiazole acid glutarate is left upon evaporation of the solvent. This compound, when washed with hexane, melts at 84° C.

*Example XII.—3-p-methoxyphenyl-5-hydroxymethyl 1,2,4-oxadiazole acid succinate*

Equimolecular amounts of 3-p-methoxyphenyl-5-hydroxymethyl-1,2,4-oxadiazole and succinic anhydride are heated to to 120° C. for 8 hours in anhydrous pyridine. The mixture is cooled and treated with diluted hydrochloric acid. The dissolved material is treated with a 5% sodium carbonate solution and with ether. The acid reaction product is recovered from the alkaline solution by acidification. The ether is extracted, washed and dried. Upon removal of the solvent, the substantially pure 3 - p - methoxyphenyl-5-hydroxymethyl-1,2,4-oxadiazole acid succinate is left. Upon crystallization from benzene, it melts at 104° C.

3 - p - chlorophenyl-5-hydroxymethyl-1,2,4-oxadiazole acid succinate, M.P. 132° C. may be obtained by a similar method.

What I claim is:

1. 3 - para - aminophenyl - 5 - hydroxymethyl - 1,2,4-oxadiazole.

2. 3-para-carbethoxyaminophenyl - 5 - hydroxymethyl-1,2,4-oxadiazole.

References Cited by the Examiner

UNITED STATES PATENTS 2,656,366  10/1953  Minlon.

FOREIGN PATENTS 1,279,280  11/1961  France.

OTHER REFERENCES

Burger: Medicinal Chemistry, Reinhold, 1960, page 348.

Migrdichian, V.: Organic Synthesis, New York, Reinhold Publishing Corp., 1957, pp. 323, 337.

Palazzo et al.: Boll. Chem. Farm., vol. 101, 251–258 (1962).

ALEX MAZEL, *Primary Examiner.*

HENRY R. JILES, *Examiner.*

RICHARD J. GALLAGHER, *Assistant Examiner.*